United States Patent
Zhu et al.

(10) Patent No.: US 11,371,344 B2
(45) Date of Patent: Jun. 28, 2022

(54) METHOD FOR IDENTIFYING A MEDIUM STRUCTURE COUPLING AND A FRACTURE NETWORK MORPHOLOGY OF A SHALE GAS RESERVOIR

(71) Applicant: University of Science and Technology Beijing, Beijing (CN)

(72) Inventors: Weiyao Zhu, Beijing (CN); Zhiyong Song, Beijing (CN); Ming Yue, Beijing (CN); Yunfeng Liu, Beijing (CN); Zhen Chen, Beijing (CN); Dongxu Ma, Beijing (CN); Wenchao Liu, Beijing (CN); Qian Qi, Beijing (CN)

(73) Assignee: UNIVERSITY OF SCIENCE AND TECHNOLOGY, Beijing (CN)

( * ) Notice: Subject to any disclaimer, the term of this patent is extended or adjusted under 35 U.S.C. 154(b) by 449 days.

(21) Appl. No.: 16/620,657

(22) PCT Filed: Sep. 21, 2018

(86) PCT No.: PCT/CN2018/107074
§ 371 (c)(1),
(2) Date: Dec. 9, 2019

(87) PCT Pub. No.: WO2020/056750
PCT Pub. Date: Mar. 26, 2020

(65) Prior Publication Data
US 2021/0003005 A1    Jan. 7, 2021

(51) Int. Cl.
*E21B 49/02* (2006.01)
*E21B 43/26* (2006.01)
*G01V 99/00* (2009.01)
*G01N 3/08* (2006.01)

(52) U.S. Cl.
CPC .............. *E21B 49/02* (2013.01); *E21B 43/26* (2013.01); *G01N 3/08* (2013.01); *G01V 99/005* (2013.01);
(Continued)

(58) Field of Classification Search
CPC .......... E21B 49/00; E21B 49/02; E21B 43/26; E21B 2200/20; G01N 3/08;
(Continued)

(56) References Cited

U.S. PATENT DOCUMENTS

| 8,731,889 B2 * | 5/2014 | Du ........................ E21B 43/267 703/10 |
| 10,571,605 B2 * | 2/2020 | Crawford ................ E21B 43/26 |

(Continued)

FOREIGN PATENT DOCUMENTS

| CN | 104295281 A | 1/2015 |
| CN | 104359817 A | 2/2015 |

(Continued)

OTHER PUBLICATIONS

Mohammadmoradi, S.P. "Pore Morphological Multi-Phase Digital Rock Physics Models" Thesis, U. Calgary (2016) available from <https://prism.ucalgary.ca/handle/11023/3485> (Year: 2016).*

(Continued)

*Primary Examiner* — Jay Hann
(74) *Attorney, Agent, or Firm* — Bayramoglu Law Offices LLC

(57) ABSTRACT

A method for identifying a medium structure coupling and a fracture network morphology of a shale gas reservoir includes the following steps. Firstly, performing a fracturing test on shale cores by using a modified Brazilian disc test and categorizing the fracture network morphology. Secondly, performing a shale matrix-fracture structure and stress sensitivity test on the shale cores having different fracture network morphology. After that, determining a stress sensitivity constant of different fracture network morphology according to indoor core data and finally preparing an identification chart of the fracture network morphology based on an indoor core stress sensitivity test combined with a production practice. The identification chart can be applied to an actual fracturing well, and the fracture network morphology is directly identified by a real-time effective stress and a normalized flow.

4 Claims, 2 Drawing Sheets

(52) U.S. Cl.
CPC .... *E21B 2200/20* (2020.05); *G01N 2203/026* (2013.01); *G01V 2210/624* (2013.01); *G01V 2210/646* (2013.01)

(58) Field of Classification Search
CPC .......... G01N 2203/026; G01V 99/005; G01V 2210/624; G01V 2210/646
See application file for complete search history.

(56) References Cited

U.S. PATENT DOCUMENTS

| | | | |
|---|---|---|---|
| 10,935,684 B2 * | 3/2021 | Gu | ........................ E21B 43/26 |
| 2017/0275970 A1 | 9/2017 | Crawford et al. | |

FOREIGN PATENT DOCUMENTS

| | | | |
|---|---|---|---|
| CN | 104977195 A | 10/2015 | |
| CN | 106198338 A | 12/2016 | |
| CN | 104594885 B | 5/2017 | |
| CN | 107622328 A | 1/2018 | |

OTHER PUBLICATIONS

Song, Z., et al. "Morphological Characteristics of Microscale Fractures in Gas Shale and its Pressure-Dependent Permeability" Interpretation, vol. 5, No. 1 (2017) (Year: 2016).*

Chen, D., et al. "Dependence of gas shale fracture permeability on effective stress and reservoir pressure: Model match and insights" Fuel, vol. 139, pp. 383-392 (2015) (Year: 2014).*

* cited by examiner (a) feather-like fracture network (b) tufted fracture network (c) meshed fracture network (d) tree-like fracture network

METHOD FOR IDENTIFYING A MEDIUM STRUCTURE COUPLING AND A FRACTURE NETWORK MORPHOLOGY OF A SHALE GAS RESERVOIR

CROSS REFERENCE TO THE RELATED APPLICATIONS

This application is the national phase entry of International Application No. PCT/CN2018/107074, filed on Sep. 21, 2018, the entire contents of which are incorporated herein by reference.

TECHNICAL FIELD

The present disclosure pertains to the technical field of petroleum and natural gas exploitation. More particularly, the present disclosure pertains to a method for identifying a medium structure coupling and a fracture network morphology of a shale gas reservoir.

BACKGROUND

The external dependence of natural gas in China reached up to 39% in 2017, and it is estimated that the external dependence will approach 50% in 2035. Therefore, China is confronted with severe safety issues of petroleum and natural gas. China is rich in resources of shale gas reservoirs. As of 2017, the exploitable resources of shale gas of China amounted to approximately 36 trillion cubic meters, accounting for approximately 20% of the world. Compared with shale gas reservoirs in other countries, shale gas reservoirs in China have the characteristics of a deep buried depth (generally 1500-4000 meters, and the deepest one reaches 6950 meters), low permeability (the permeability is 0.01-1 mD), microcrack development, and complex multi-scale flow mechanism.

The fracturing reformation of reservoir strata is a primary approach to improving the shale gas reservoir exploitation, enabling the shale reservoir strata to form a multi-scale pore-fracture network consisting of nano and micron pores, microcracks, and artificial fractures. Based on this multi-scale pore-fracture network, the shale gas reservoir has a characteristic of strong nonlinear flow. In an exploitation process of shale reservoir strata, the structures of nano and micron pores, microcracks and artificial fractures are subjected to a coupling effect of the seepage field and stress field, which has a complex mechanism and strong nonlinearity. Currently, there is no technique and method for observing and monitoring the fracture morphology. Therefore, it is urgent to develop a method for identifying the multiple medium coupling and fracture network morphology of the shale gas reservoir.

SUMMARY

The technical problem to be solved by the present disclosure is to provide a method for identifying the medium structure coupling and fracture network morphology of the shale gas reservoir.

The method includes the following steps:

(1) categorizing the fracture network morphology: performing a fracturing test on shale cores by using a modified Brazilian disc test, categorizing the fracture morphology as a tree-like fracture network, a feather-like fracture network, a tufted fracture network and a meshed fracture network; wherein, the modified Brazilian disc test is the method disclosed in the invention patent "device and method for analyzing fracture propagations of shale cores" (CN201410548672.6).

(2) performing a shale matrix-fracture structure and stress sensitivity test: selecting the cores having different fracture morphology in step (1), performing the shale matrix-fracture structure and stress sensitivity test on the cores by a core displacement experiment (setting effective stress range as 4 MPa-22 MPa), and recording parameters of core permeability and effective stress;

(3) determining a stress sensitivity constant of different fracture network morphology: according to the parameters of the permeability and the effective stress of the cores having the different fracture morphology in step (2) under different stress conditions, fitting experimental data in a form of an exponential function, and obtaining the stress sensitivity constant; and (4) preparing an identification chart of the fracture network morphology: according to a measured stress sensitivity constant of four types of the fracture network morphology obtained in step (3), establishing a model of the effective stress and a production well flow, and normalizing a flow parameter to form an identification chart of the fracture network morphology ultimately.

In step (3), fitting the experimental data in the form of the exponential function is specified as follows.

According to a method of the effective stress, the mathematical formula of the effective stress and a change rate of the permeability is $$K = K_0 e^{-b(\sigma - \alpha p)},$$

where $\sigma$ is a pressure of the overlying strata, and the unit thereof is MPa; $p$ is a pore pressure of the reservoir strata, and the unit thereof is MPa; $\alpha$ is a coefficient of the effective stress; $K_0$ is the permeability of a rock when the effective stress is zero, and the unit thereof is $10^{-3}$ $\mu m^2$; $K$ is the permeability under conditions of arbitrary formation pressure, and the unit thereof is $10^{-3}$ $\mu m^2$; $b$ is the stress sensitivity constant, and the unit thereof is $Mpa^{-1}$; wherein, the shale reservoir has characteristics of a microcrack development, then $\alpha$ is set as 1.

The fracture network morphology is distinguished based on the stress sensitivity constant $b$. Since in the actual production process, $K$ and $Q$ (a current daily gas production) are positively correlated, i.e., $K/K_0 = Q/Q_0$, an exponential relationship between a normalized flow and the effective stress is obtained. Thus, the process of preparing the identification chart of the fracture network morphology in step (4) includes: preparing the stress sensitivity chart of different fracture network morphology based on the indoor core stress sensitivity test in step (2), wherein the abscissa represents the effective stress and the ordinate represents the normalized flow parameter.

The normalized flow parameter is a ratio of the current daily gas production $Q$ to the daily peak gas production $Q_{max}$.

The advantages of the above-mentioned technical solution of the present disclosure are as follows.

In the above-mentioned technical solution, the prepared chart can be applied to an actual fracturing well and the fracture morphology is directly identified by the real-time effective stress and the normalized flow, which has a profound significance in the implementation effect of performing volume fracturing on shale gas reservoirs and developing the exploitation working system.

DETAILED DESCRIPTION OF THE EMBODIMENTS

The technical problems, the technical solutions, and the advantages of the present disclosure will be clearly described hereinafter with reference to the drawings and the embodiments.

The present disclosure provides a medium structure coupling of a shale gas reservoir and a method for identifying the fracture network morphology.

Figure 1:
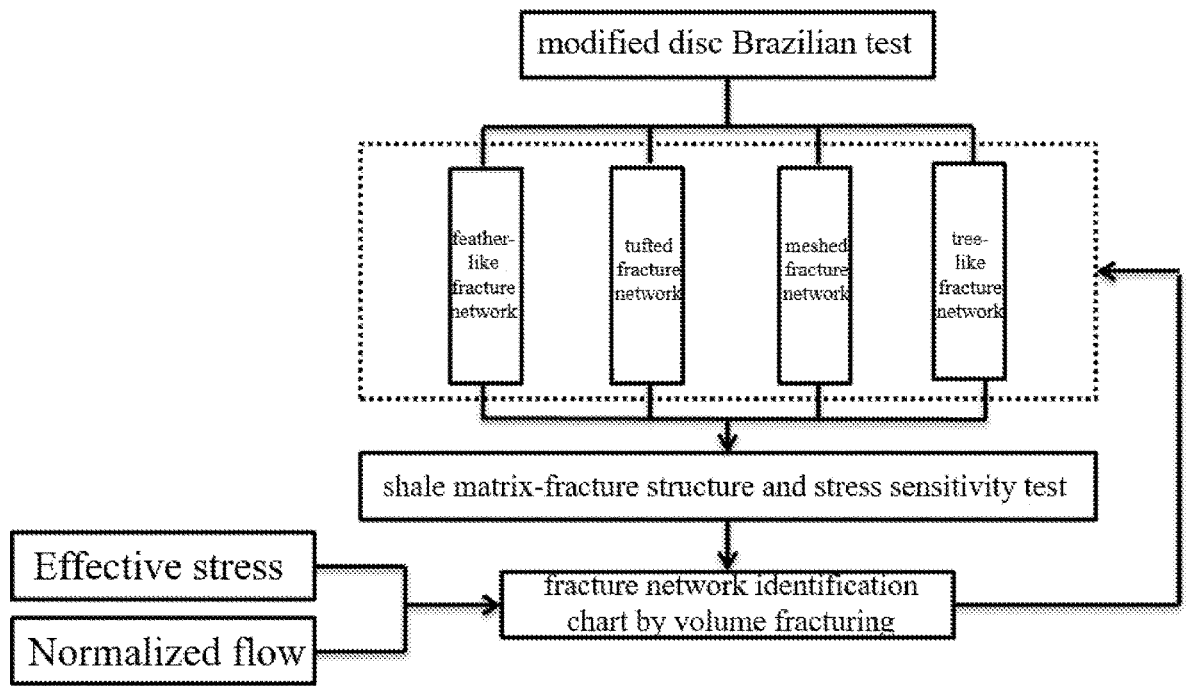
FIG. 1 is a schematic flow chart of a method for identifying the medium structure coupling and the fracture network morphology of the shale gas reservoir.

As shown in FIG. 1, the method has the following steps:

(1) categorizing the fracture network morphology: the modified Brazilian disc test which is used to perform the fracturing test on shale cores, the fracture morphology is categorized as: the tree-like fracture network, the feather-like fracture network, the tufted fracture network and the meshed fracture network;

(2) performing the shale matrix-fracture structure and stress sensitivity test: the cores of different fracture morphology in step (1) being selected, the shale matrix-fracture structure and stress sensitivity test is performed on the cores by a core displacement experiment, and the parameters of the core permeability and the effective stress are recorded;

(3) determining the stress sensitivity constant of the different fracture network morphology: according to the parameters of the permeability and the effective stress of the cores having different fracture morphology under different stress conditions in step (2), the experimental data is fitted in the form of an exponential function, and the stress sensitivity constant is obtained; and (4) preparing the identification chart of the fracture network morphology: according to the measured stress sensitivity constant of the four types of fracture network morphology obtained in step (3), the model of the effective stress and a production well flow is established, and the flow parameter is normalized to form an identification chart of the fracture network morphology ultimately.

In the detailed design, the present disclosure is based on an indoor core experiment of a shale gas reservoir in China and summarizes a method for identifying the medium structure coupling and the fracture network morphology of the shale gas reservoir. The method performs the quantification and representation on a complex fracture network formed after the shale gas reservoir volume fracturing, which is of great significance to the actual field exploitation and the recovery efficiency estimation.

The specific embodiment is as follows.

(1) Shale matrix-fracture structure and stress sensitivity test.

The matrix shale stress sensitivity test is performed at room temperature and a normal pressure, and nitrogen is used as the experimental gas for simulating natural gas. The confining pressure equipment includes a high-precision plunger displacement pump. The back pressure control system includes a BP-100 air spring back pressure valve manufactured by an American company, and a high-precision multi-stage plunger displacement pressure pump is used to control the BP-100 air spring back pressure valve. The experimental method is the "pressure difference-flow method". The effective stress selected by the experiment is 4 MPa, 5 MPa, 7 MPa, 9 MPa, 11 MPa, 13 MPa, 16 MPa, 19 MPa, and 22 MPa, respectively. The back pressure is set as 1 MPa, and the inlet pressure is set as 3 MPa in the experiment. The back pressure and the inlet pressure keep constant.

The experiment has the following steps.

(1) The core is placed in a drying oven and is dried at a constant temperature of 70° C. for 50 h. The essential data such as length, diameter, weight, porosity and permeability are measured.

(2) The core is installed in the core holder and the initial value of the instrument returns to zero. The confining pressure is increased to 4 MPa. The back pressure is increased to 1 MPa and maintains constant.

(3) During the entire experiment process, the injection pressure is 3 MPa and maintains constant. A single-phase gas seepage experiment is performed.

(4) When the seepage state is stabilized, the permeability of the rock sample under the initial effective stress is recorded. The confining pressure is adjusted according to a predetermined effective stress value and the different permeability K is recorded during the process of the increasing confining pressure. The effective stress value of different confining pressures is measured as planned. After the effective stress value reaches a maximum effective stress, the pressure is gradually reduced according to the pressure point prepared by the pressure boost experiment. Meanwhile, the permeability is measured until the experiment ends.

Figure 2:
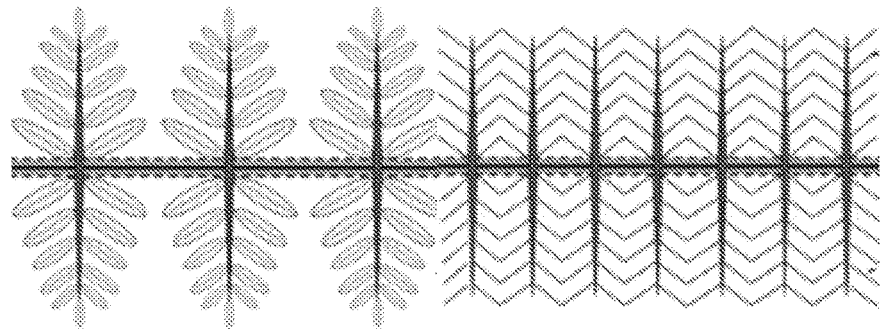
FIG. 2 is a schematic diagram showing different fracture network morphology of the present disclosure, wherein (a) denotes a feather-like fracture network, (b) denotes a tufted fracture network, (c) denotes a meshed fracture network, and (d) denotes a tree-like fracture network.
Figure 2:
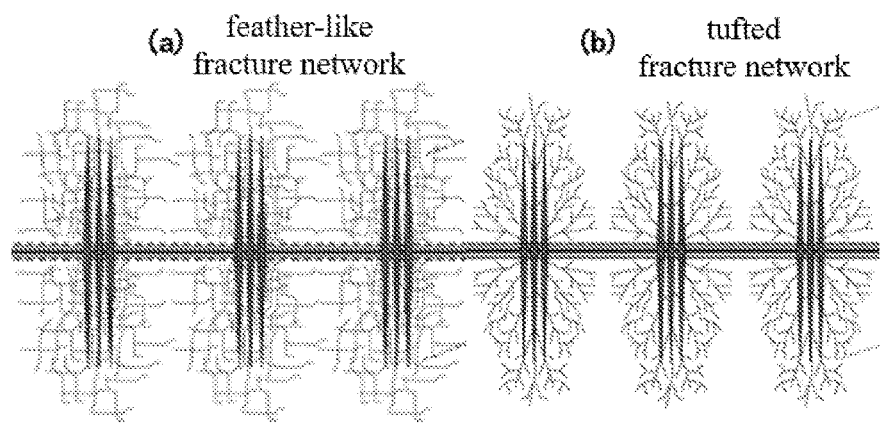

In the experiment, due to the relatively large permeability of the artificial fracturing rock sample, the "pressure difference-flow method" will pose a large experimental error. Therefore, the experiment employs the overburden pressure permeameter KFSY/T08-055 to perform the test. The fluid employed by the experiment is high purity nitrogen. The selected core is dried in a homoiothermal tank at a temperature of 105° C. for 48 hours. The pressure difference between the inlet and the outlet is 2 MPa, and the measured value is 4 MPa, 7 MPa, 14 MPa, 21 MPa, and 27 MPa. The permeability is also processed as dimensionless, which is represented by $K/K_0$, wherein $K_0$ represents the initial permeability, as shown in FIG. 2.

Below are the results and discussions of the experiment.

The results of the shale matrix-fracture structure and stress sensitivity test indicate that the larger variation range of the permeability of the shale is, the lower the initial permeability is, and the larger the descend range of the permeability is. The reason is because of the pore distribution characteristics of the rock sample and the relatively small average pore radius of the rock sample having relatively low permeability. When the effective stress changes, the small pores are readily enclosed, thereby resulting in a reduction in the permeability, which are more likely to generate a stress sensitivity situation compared with rock samples with high permeability.

The curve data of the experiment is fitted. According to the effective stress method, the effective stress and the change rate of the permeability presents a favorable exponential relationship. The mathematical formula of the exponential relationship is as follows $$K = K_0 e^{-b(\sigma - \alpha p)},$$

wherein $\sigma$ is a pressure of the overlying strata, and the unit thereof is MPa; p is a pore pressure of the reservoir strata, and the unit thereof is MPa; α is a coefficient of the effective stress; $K_0$ is the permeability of a rock when the effective stress is zero, and the unit thereof is $10^{-3}$ μm$^2$; K is the permeability under conditions of arbitrary formation pressure, and the unit thereof is $10^{-3}$ μm$^2$; b is the stress sensitivity constant, and the unit thereof is Mpa$^{-1}$; N. R. Warpinski and L. W. Teufel provided the effective stress coefficient of different porous mediums by the experiment in 1992, and considered that when the reservoir strata occurs in a fracture development, α→1. Since the shale reservoir has characteristics of a microcrack development, and thus α is approximately equal to 1.

Under the gas reservoir condition, the pores of the reservoir strata are in a compressed state due to the effect of the rock pressure of the overlying strata. After the gas reservoir condition is eliminated, the pressure borne by the rock skeleton is relieved, and some of the pore passages inside the reservoir strata will open or become larger. The low effective stress interval in the experiment cannot reflect the real situation of the reservoir strata. If the reservoir strata need to be evaluated, the initial effective pressure of the original formation should be used as a starting point to test the stress sensitivity of the shale gas reservoir. The buried depth of the reservoir strata in the target area is approximately 1600 meters. According to the data of the field formation test and logging, the pressure of the overlying strata and the pore pressure of the shale reservoir strata are approximately 34 MPa and 25 MPa, respectively. Therefore, an effective pressure of 9 MPa should be selected as the starting point of the effective stress for evaluating the reservoir strata.

All the experimental points of the shale sample and the permeability and the effective stress using the effective stress of the reservoir strata as the starting point are fitted by an exponential function. In the formula, the exponential term coefficient is the stress sensitivity constant. The stress sensitivity constant is a parameter reflecting a deformation degree along with stress of a porous medium and is related to the physical properties of the rock itself and the fracture network morphology. The stress sensitivity constant calculated based on all the experimental points is 0.101 MPa$^{-1}$-0.322 MPa$^{-1}$; wherein, the range of the stress sensitivity constant of different fracture network morphology is shown in Table 1.

TABLE 2

Stress Sensitivity Constant Corresponding to Different Fracture Network Morphology

| category | range of stress sensitivity constant |
| --- | --- |
| meshed fracture | 0.287~0.322 |
| tufted fracture | 0.251~0.287 |
| feather-like fracture | 0.205~0.251 |
| tree-like fracture | 0.101~0.205 |

Figure 3:
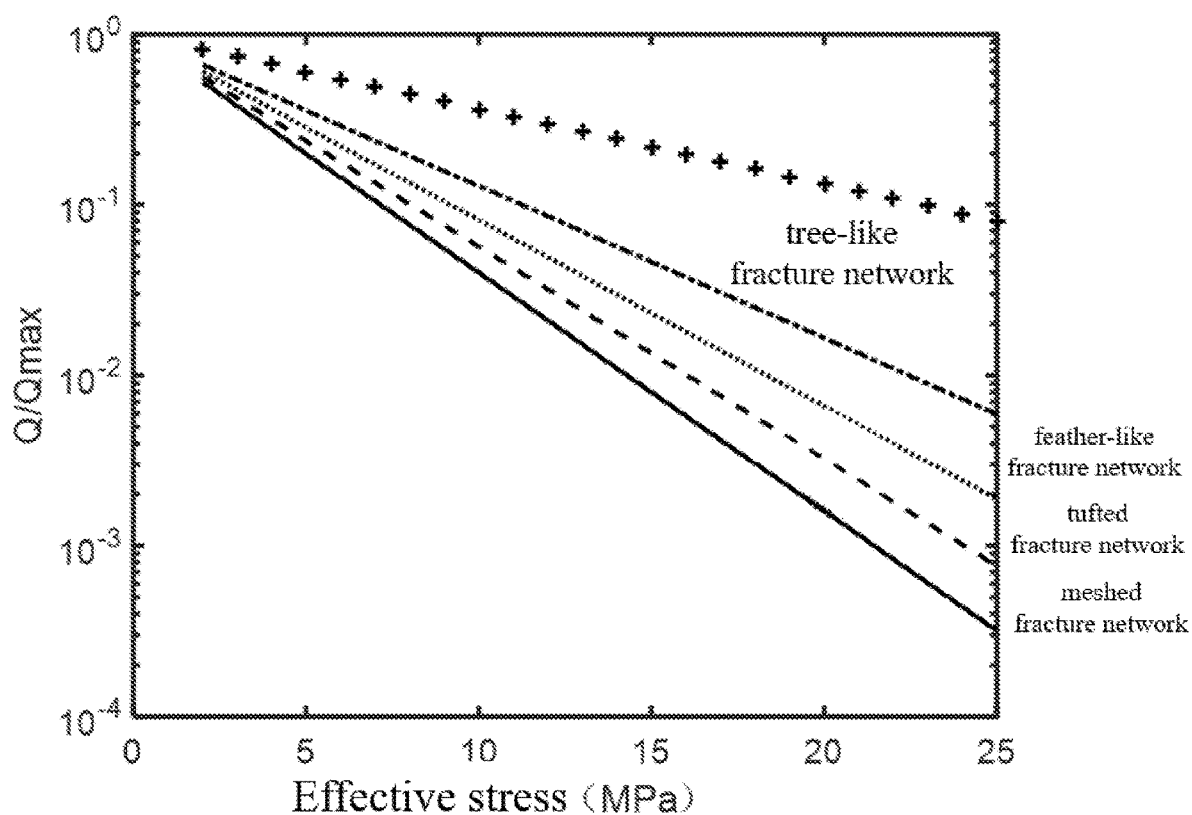
FIG. 3 is a schematic diagram showing a characteristic curve of the stress sensitivity of different fracture network morphology.

The four different types of the fracture network morphology, i.e. the feather-like fracture, the tufted fracture, the meshed fracture, and the tree-like fracture are analyzed, as shown in FIG. 3. The chart can be applied to an actual fracturing well to directly identify the fracture morphology by a real-time effective stress and a normalized flow.

An actual embodiment.

There is a horizontal well of a shale gas reservoir in Chongqing. The buried depth is 1600 meters. The initial formation pressure is 35 MPa and the daily gas production at the initial stage of volume fracturing is 200,000 cubic meters. At present, the daily production is 20,000 cubic meters and the flowing bottom hole pressure is 15 MPa.

The corrected effective stress of the formation rock is 20 MPa according to the initial formation pressure and the flowing bottom hole pressure. As of now, the daily gas production has decreased by 90%, i.e. $Q/Q_{max}$=0.1, and the stress sensitivity constant is 0.1151. The fracture network morphology is determined as the tree-like fracture network according to the table of the stress sensitivity constant. This conclusion can directly identify the fracture network morphology as the tree fracture network without recalculating the stress sensitivity constant.

The above embodiment is a preferred embodiment of the present disclosure. It should be noted that several improvements and modifications can also be made without departing from the principle of the present disclosure by those skilled in the art, and these improvements and modifications are intended to fall within the scope of protection of the present disclosure.

What is claimed is:

1. A method for identifying a medium structure coupling and a fracture network morphology of a shale gas reservoir, comprising the following steps:
    (1) categorizing the fracture network morphology: performing a fracturing test on shale cores by using a modified Brazilian disc test, categorizing the fracture network morphology as a tree-like fracture network, a feather-like fracture network, a tufted fracture network, and a meshed fracture network;
    (2) performing a shale matrix-fracture structure and stress sensitivity test: selecting the shale cores having different fracture network morphology in the step (1), performing the shale matrix-fracture structure and stress sensitivity test on the shale cores by a core displacement experiment, recording parameters of permeability and effective stress of the shale core;
    (3) determining a stress sensitivity constant of different fracture network morphology: according to the parameters of the permeability and the effective stress of the shale cores having the different fracture morphology in the step (2) under different stress conditions, fitting experimental data in a form of an exponential function, and obtaining the stress sensitivity constant; and
    (4) preparing an identification chart of the fracture network morphology: according to a measured stress sensitivity constant of four types of the fracture network morphology obtained in the step (3), establishing a model of the effective stress and a production well flow, and normalizing a flow parameter to form the identification chart of the fracture network morphology.

2. The method for identifying the medium structure coupling and the fracture network morphology of the shale gas reservoir according to claim 1, wherein, in the step (3), fitting the experimental data in the form of the exponential function is specified as follows:
    according to a method of the effective stress, a mathematical formula of the effective stress and a change rate of the permeability is as follows:

$$K = K_0 e^{-b(\sigma - \alpha p)},$$

in the mathematical formula, σ is a pressure of overlying strata, and a unit of the pressure is MPa; p is a pore pressure of reservoir strata, and a unit of the pore pressure is MPa; α is a coefficient of the effective stress; $K_0$ is the permeability of a rock when the effective stress is zero, and a unit of the permeability is $10^{-3}$ μm$^2$; K is the permeability under conditions of arbitrary formation pressures, and the unit of the permeability is $10^{-3}$ $\mu m^2$; b is the stress sensitivity constant, and a unit of the stress sensitivity constant is $Mpa^{-1}$; wherein, the shale gas reservoir has characteristics of a microcrack development, then α is set as 1.

3. The method for identifying the medium structure coupling and the fracture network morphology of the shale gas reservoir according to claim 1, wherein, a process of preparing the identification chart of the fracture network morphology in the step (4) comprises: preparing a stress sensitivity chart of different fracture network morphology based on the shale matrix-fracture structure and stress sensitivity test in the step (2), wherein an abscissa of the stress sensitivity chart represents the effective stress, and an ordinate of the stress sensitivity chart represents a normalized flow parameter.

4. The method for identifying the medium structure coupling and the fracture network morphology of the shale gas reservoir according to claim 3, wherein, the normalized flow parameter is a ratio of a current daily gas production to a daily peak gas production.

\* \* \* \* \*